United States Patent [19]

O'Connell et al.

[11] Patent Number: 4,539,210

[45] Date of Patent: Sep. 3, 1985

[54] PROCESS FOR MAKING A STRUCTURED MEAT PRODUCT

[75] Inventors: Peter O'Connell; Michael A. Gibbs, both of Los Angeles, Calif.

[73] Assignee: Peter M. O'Connell, Philadelphia, Pa.

[21] Appl. No.: 931,501

[22] Filed: Aug. 7, 1978

[51] Int. Cl.$^3$ .............................................. A23L 1/31
[52] U.S. Cl. ........................................ 426/56; 426/72; 426/104; 426/238; 426/272; 426/641; 426/506; 426/513; 426/516; 426/802
[58] Field of Search ................ 426/56, 92, 104, 272, 426/274, 276, 641, 644, 645, 513, 516, 802, 238, 506

[56] References Cited

U.S. PATENT DOCUMENTS

| | | | |
|---|---|---|---|
| 2,203,318 | 6/1940 | Yerk | 426/513 X |
| 2,290,854 | 7/1942 | Hoy | 426/641 |
| 3,236,656 | 2/1966 | Wittig | 426/513 X |
| 3,238,046 | 3/1966 | Komarik | 426/272 |
| 3,533,803 | 10/1970 | Schack et al. | 426/56 |
| 3,563,764 | 2/1971 | Posegate | 426/92 |
| 3,765,902 | 10/1973 | Charter | 426/92 X |
| 3,793,466 | 2/1974 | Hawkins et al. | 426/274 |
| 3,901,980 | 8/1975 | Connick et al. | 426/513 X |
| 3,903,315 | 9/1975 | Giles et al. | 426/516 X |
| 3,911,154 | 10/1975 | Weatherspoon | 426/513 X |

*Primary Examiner*—Robert A. Yoncoskie
*Attorney, Agent, or Firm*—Spensley, Horn, Jubas & Lubitz

[57] ABSTRACT

A structured meat product which may resemble a natural cut of meat comprises a lean portion formed by extrusion of multiple lean meat chunks bonded by a protein exudate and a fat cap or rim formed by simultaneous extrusion of a fat emulsion. The product is made by preparing chunks of lean meat substantially free of fat, gristle and sinew. The muscle scaffold network is slackened e.g., by multiple severing of the connective tissue of the lean meat chunks. These chunks then are massaged under reduced pressure to produce the protein exudate, while sufficient water is added to obtain a desired protein-to-moisture ratio. Fat trimmings are ground and blended into an emulsion which is simultaneously extruded with the lean meat chunks through separate but adjacent extrusion heads which may be shaped to produce a product resembling a steak, roast or other conventional cut of natural meat. The product has uniform, reproducible characteristics of appearance, size, weight, shrinkage on cooking, juiciness, taste and texture.

35 Claims, 2 Drawing Figures

PROCESS FOR MAKING A STRUCTURED MEAT PRODUCT

BACKGROUND OF THE INVENTION

1. Field of the Invention

The present invention relates to a process for making a structured meat product resembling e.g., natural steak, but having controlled, reproducible characteristics.

2. Description of the Prior Art

Steaks and roasts are universally popular foods. However, the rising cost of beef is likely to limit how often these products can be enjoyed by the average family. Thus, a need exists for structured meat products which closely simulate natural steaks and roasts in appearance, taste, texture and nutritional value, but which cost less. One object of the present invention is to provide such structured meat products. A number of features characterize a good natural steak or roast. When uncooked, each has an appearance characterized by a certain shape and size, often with a strip of white fat forming a cap or rim for the lean, red muscle. During cooking, the meat exhibits certain shrinkage characteristics, including changes in both size and shape. The cooked product exhibits distinctive characteristics of appearance, taste, texture, tenderness, juiciness and absence or presence of fat, gristle and sinew. These characteristics effect not only consumer product acceptance and meal enjoyment, but also effect both the manner of sale and preparation of the products.

A natural, high-grade steak includes a portion of red muscle which often is marbled with fat. This fat content results in juiciness on cooking and improves the taste of the meat. The texture and toughness of the steak is determined by the arrangement of connective tissue in the muscle, and by the presence or absence of gristle. The latter, while visible in the raw steak, cannot easily be removed without breaking up the physical integrity of the steak. The fat cap or rim advantageously achieves a brownish appearance on cooking, and adds to the juiciness and taste of the meat.

These characteristics vary substantially in individual steaks, even in products of seemingly identical quality. For example, if two top-quality steaks of the same raw size and shape are cooked, the shrinkage and change of shape may be significantly different between the two. Such shrinkage and shape change (including e.g., a curling of the meat on cooking) results from the distribution of elastin-containing connective tissues in the muscle. Upon heating, the elastin protein contracts, resulting in an amount of shrinkage and change of shape depending on the particular connective tissue arrangement. Since this arrangement is not visible in the raw meat, the degree of shrinkage and the change in shape on cooking are neither uniform nor predictable for natural meat. A further object of the present invention is to provide a structured meat product in which the shrinkage and shape change, as well as the appearance after cooking, are both uniform and predictable.

Such reproducibility in size, shape, shrinkage and appearance after cooking is particularly important in the restaurant and fast-food industries. In restaurants which sell steak, particular attention must be paid to the selection of individual cuts of meat, and individual adjustment must be made of the time and temperature of cooking to obtain even a reasonably uniform end product. Even with this individual attention, the taste, texture and appearance of the cooked product will vary from steak to steak. These problems in the past have virtually ruled out the sale of steaks by fast-food, large volume restaurants. In such establishments, uniformity of end product is the key to public acceptance, and simplification of cooking, including uniform cooking times and temperatures, is the key to efficient, low-cost preparation of the product. In addition, uniformity of size, weight, shrinkage and nutritional value are required to ensure that the fast-food vendor can meet the truth in advertising requirements and other laws governing the sale of food products. In addition, fast-food vendors need a large supply of the product, a requirement which has not been met in the past by existing sources of high-grade, steak quality natural meat.

A further object of the present invention is to provide a structured meat product resembling natural steak, but having such reproducible uniformity as to permit its use by fast-food vendors. An additional object of the present invention is to provide processes for making such structured meat products. The use of the inventive processes can make available the structured meat products in large enough quantities to satisfy the demands of high volume fast-food vendors.

Another factor of importance to restaurants, institutional kitchens and individuals alike is cost. Natural steaks and roasts are obtained from high-grade, high-cost beef, which typically has the high muscle fat content that result in the juicy, tender final product. Considerable lean beef is available at much lower cost. This cow beef or range beef is characterized by muscle having a relatively low fat content. When cooked in its natural form, without restructuring, the meat is tough and may not be as tasty as high-grade beef, although its nutritional value is commensurate with these higher cost cuts of meat. Another object of the present invention is to provide processes for preparing structured meat products from relatively less expensive lean meat sources, which products exhibit the desirable qualities of taste, texture and appearance of the higher cost natural cuts of high-grade meat.

Various attempts have been made in the past to provide processed or structured meat products, but none has satisfied all of the objectives discussed above.

For example, in the "flaked and formed" process chunks of meat are finely cut into extremely thin flakes which are then pressed together to form a patty with the outline shape of a steak. The fat content can be controlled by including more or fewer flakes of fat in the formed product. This permits the formation of a product which has a firmer texture than hamburger, and which has some visual resemblance to steak. However, although improved over hamburger, neither the texture, taste or appearance truely simulate a natural steak.

As another example, the U.S. Pat. No. 2,203,318 to Yerk discloses a process for making a steak-like product from rather tough grade meat. The process involves rupturing of the meat fibers by inserting elongated hook members into the meat and withdrawing them, thereby pulling and breaking the connective tissue. This operation is repeated until the meat fibres are pulled apart sufficiently to product a kneadable meat mass. Ground lean and fat trimmings may be added to the meat mass. The mass is then formed into steaks by rolling the meat on a flat surface and trimming it to the desired size. The meat may be extruded onto the surface so as to align the meat fibres, which are felted together by pressure rollers to form the resultant product.

A process of this type does result in tenderizing the meat as a result of the ruptured connective tissue. However, the resultant product does not have the appearance of a natural cut of meat, and does not have reproducible characteristics.

The U.S. Pat. No. 2,832,127 to Gwilliam et al. also contemplates the building of a steak product from low-grade beef. This is done by first grinding the low-grade beef much in the manner that ordinary hamburger is prepared. However, the ground meat is not compressed, but rather it is worked by hand until the meat bits begin to form distinct elongated strands or tendrils. The meat mass is separated into individual portions, each of which is subjected to a rebuilding step made up of combined localized compression and folding operations that result in the final steak product. The localized compression interlocks the overlapping and adjacent tendrils to give the product a natural-fibre-like structure. The compressed tendril structure may be folded over to double or multiple thickness so as to achieve an overall thickness commensurate with that of natural steak.

The U.S. Pat. No. 3,793,466 to Hawkins et al. and No. 3,903,315 to Giles et al. disclose related processes for forming a restructured meat product from an extruded fibrous comminute of initially tough meat. In the Hawkins et al. process, the tough musculature of a meat carcass is comminuted in a colloid mill or like apparatus. The comminute then is extruded as multiple streams concurrently with other edible material that forms a matrix in which the meat comminute streams are distributed. The matrix material is noticeably different in color from the fibrous meat comminute, and may constitute a wheat-flour composition. Preferably the matrix material is extruded concurrently with the meat comminute in the form of angular streams surrounding the streams of meat comminute. The extruded elongated product, in which the fibres of meat comminute are generally aligned in the direction of extrusion, is subjected to lateral compaction. The compacted extrudate then has an irregular outline resembling that of slices cut from a joint of natural meat.

The process of Giles et al. (U.S. Pat. No. 3,903,315) is similar to that of Hawkins et al. in that a comminute of meat is extruded through a plurality of fine passages to form coherent strings which are then laterally compacted. Giles, however, adds to the meat comminute a fibre which imparts fibrosity to the comminute. The fibre must be of set (coagulated) protein as distinct from the undenatured protein of raw meat. Thus the set protein may consist of the fibres of cooked meat or of spun protein fibres such as acid-coagulated soy protein. The addition of this set protein fibre results in a product in which the unified mass of aligned strings of meat comminute and fibre retain their essential individuality upon cooking.

A disadvantage of the foregoing type of restructured meat product is that it is formed from tendrils or strings or comminuted meat. The product thus is essentially different in appearance and texture from good natural steak or roast.

A more natural appearing roast product is produced by the method of U.S. Pat. No. 3,911,154 to Weatherspoon. Here a roast-like product includes a fat cover which is a unitary piece of meaty material having a fat side and a lean side. This fat cover is cut from the original carcass as a unitary member having a typical width of about six to seven inches, and an average fat thickness of one-half inch on one surface and a lean thickness of one-half inch on the other surface. This unitary fat cover is affixed to a stuffing horn which then is stuffed with lean strips of beef together with a binder material. The lean strips are prepared so as to be one to two inches in diameter and to have a length in the range of four to fourteen inches, with the majority of the muscle fibres running lengthwise to the direction of the strips. The binder material consists of finely ground trim material high in connective tissue.

A manufactured meat product of the type just described does simulate the appearance of a natural roast, and may have uniform shape from one loaf to the next. However, the process is laborious, requiring the preparation of a unitary fat cover and the mounting and stuffing of this cover on a stuffing horn. Simulation of a steak product is not readily achieved. By contradistinction a further object of the present invention is to provide a process for making a structured meat product in which a fat cap or rim is produced by extrusion. The use of this process substantially simplifies the processing required to form the fat cap, and facilitates the mechanized production of structured meat products of various configurations. A related objective of the present invention is to provide a process for simultaneously extrusion-forming a structured meat product including a lean portion and a fat portion.

An extruded poultry meat product is disclosed by the U.S. Pat. No. 3,563,764 to Posegate. In this process, a turkey loaf is formed by simultaneously extruding light and dark meat turkey through different sections of an extrusion nozzle separated by a divider plate. The extruded product is in the form of a loaf having a rectangular cross-section, which in no way resembles the shape of a natural meat product. Alternatively, the poultry is extruded into a casing to form a turkey roll having separate light and dark meat sections. The Posegate process has no teaching or suggestion of the concept of simultaneously extruding a meat component and a fat component so as to form a structured product having the shape and appearance of a natural cut of meat including a fat cap or rim.

In the Posegate patented process, the poultry pieces are bound together by an adhesive binder coating of salt-soluble protein. This protein is extracted from the poultry itself by treating the poultry pieces with an edible metallic salt, and agitating the pieces sufficiently to cause the meat to become soft and pliable and covered with a creamy, sticky coating. During the following extrusion operation, sufficient pressure is employed to force the meat pieces into solid contact, which contact is thereafter maintained by the salt-soluble protein adhesive binder.

The use of a protein exudate as a binder for primal cuts of whole, uncooked meat also is disclosed in the U.S. Pat. No. 3,076,713 to Maas. The objective of the Maas process is to bond together whole or "cut-down" primal cuts of meat so as to produce a bonded meat product which will not separate upon cutting. Thus, the Maas process is particularly useful for preparing canned hams, which previously had a tendency to break apart on slicing. To avoid this problem, primal cuts or large chunks of meat weighing not less than about one-half pound are subjected to mechanical working. This working, which may be carried out in a meat mixer, causes a creamy, tacky exudate to form on the surfaces of the meat. The addition of ordinary salt and/or alkaline polyphosphates hastens the formation of this exudate.

When the large chunks of meat with this exudate coating are then packed into a can or other rigid or semi-rigid container, the tacky exudate binds the cuts together so that the resultant canned ham or like product will not separate into pieces when later sliced and cooked.

The Maas patent states that the "invention is not applicable to pieces or chunks of meat weighing less than about one-half pound and thus does not apply to ground, comminuted or chopped meat, even of the coarse variety." Thus, the Maas patent teaches away from another objective of the present invention, which is to provide a process for extrusion-forming relatively small chunks of lean meat into a structured meat product which includes a simultaneously extruded fat cap or rim.

The simultaneous extrusion of a meat-containing component and a fat-containing component to form a pet food is shown in the U.S. Pat. No. 3,765,902 to Charter. This pet food product is totally unrelated in both content and appearance to a natural meat cut intended for human consumption. The dual extrusion head employed by Charter includes a cylindrical inner member having a plurality of lateral ports through which the fat-containing component is extruded in the form of plural strands. These are intermixed with the meat-containing component which itself is extruded through a cylindrical tube that surrounds the fat component supply member. This arrangement results in an elongated ribbon of extruded material in which the red meat-containing component has intermixed with it a plurality of strands of white fat-containing material. The extruded ribbon is diced into pellets to form a pet food in which each pellet has white components marbled throughout the main red body.

Another process for forming a structured meat product is taught in the U.S. Pat. No. 3,901,980 to Connick et al. Here, cured ham trimmings are formed into uniform patties by (a) grinding the trimmings, (b) adjusting the fat content to within a selected range, (c) adding dry ice particles to drop the temperature of the ground cured trimmings to approximately 18° F., and (d) mixing the pre-chilled ground meat so as to release proteins and other juices which promote binding of the meat particles when molded into meat patties. Thus the Connick process utilizes protein binding of comminuted cured meat trimmings to form uniform patties. The formation of meat patties by this process is in no way suggestive of the processes for forming structured meat products resembling natural steak, roasts and other natural cuts of meat, which is the principal objective of the present invention.

Yet another object of the invention is to permit engineering of the structural meat product so as to achieve enhanced characteristics that are not possible with natural meat. Although certain mechanical or enzyme injection operations can be performed on natural meat to modify its characteristics, certain features cannot be changed readily if at all. For example, it is difficult or impossible to modify the cholesterol content, the protein-to-fiber ratio, the carbohydrate content for a given amount of protein, the ratio of different classes of proteins in the meat, or the ratio of saturated to polyunsaturated fat. The present invention permits controlled modification of these and other characteristics, and thus facilitates the engineering of structured meat products to meet particular nutritional needs.

Such engineering permits the formation of meat products that satisfy the different nutritional requirement of persons of different ages or physical condition. For example, a geriatric steak product can be produced which has a significantly lower cholesterol content than natural steak, in which the fiber content is appropriately controlled for digestive purposes, in which the carbohydrate content is consistent with the needs of older, less physically active people, and in which the vitamin and mineral content is supplimented to meet daily requirements. All of this is achieved in a structured meat product having a logical portion size that is consistent with the generally limited appetite demands of an older person.

As another example of such engineering, different meat products can be structured to meet the specific requirements of growing children of different ages. For example, youngsters of a particular age way require a product having a relatively high carbohydrate-or calorie-to-protein ratio, supplimented vitamin and mineral content, and a proper protein class ratio to insure complete utilization of the protein in the meat without the need for complimentary protein sources. This too must be provided in a product that is appropriately sized to insure that all of these nutritional values will be provided in a single portion that will be completely eaten by the child, and will not be so large that the child will "leave over" a substantial amount. These features insure that the child will get optimum nutritional benefit at least cost.

Such engineered meat products can thus be optimized to meet the nutritional requirements of each age group and physical condition of the user. Substantial improvements in diet and health may be achieved at low cost.

SUMMARY OF THE INVENTION

These and other objectives are achieved by the inventive structured meat products and the processes for making them. In accordance with the principal method, large primal cuts of natural meat are denuded of all fat, gristle, sinew and skin, and are cut into individual lean meat chunks having a typical weight of about one-quarter pound, and a typical size of between about one-quarter inch and three inches cubed. The muscle scaffold network in these meat chunks is slackened by multiple severing of the connective tissue in the meat.

The resultant meat chunks are massaged under reduced pressure, while introducing sufficient water so as to obtain a protein-to-moisture ratio in the massaged meat chunks within a preselected range. The massaging is carried out for a controlled time and temperature so as to produce a sticky protein exudate on the chunks. Steam inspection may be used prior to the massaging to bring the meat up to a temperature that optimizes protein exudate production and moisture acceptance by the meat chunks. Advantageously, $CO_2$ snow (i.e., particles of dry ice) is introduced during the final portion of the massaging operation. The $CO_2$ gas from the dry ice expels oxygen, thereby giving the meat an excellent bloom and reducing the bacteria count, while the dry ice itself chills the chunks to a temperature at which the meat will maintain a definite shape under pressure extrusion.

The fat which was separated from the lean meat muscle is chopped and blended into a paste-like emulsion. This is chilled, advantageously by using $CO_2$ snow, to a sufficiently low temperature at which the fat emulsion can be subjected to shape-retaining extrusion.

The massaged meat chunks, now coated with the sticky protein exudate, are simultaneously extruded with the fat emulsion through separate but adjacent extrusion heads. This forms a structured meat product having a distinct shape including a lean meat region comprising the meat chunks bound together by the protein exudate and a contiguous fat region formed of the extruded fat emulsion and bound to the meat region by the protein exudate. The extrusion head may be configured to impart to the product the shape of a natural cut of meat. The product then is packaged, for example, in a transparent wrapper, and may be frozen prior to distribution.

A distinctive feature of the invention is that the structured meat products produced by the inventive process exhibit uniform, reproducible characteristics. Thus, the appearance of the product is totally reproducible. For example, if extruded in the shape of a steak, each product will have the same definite shape and size, with a like rim of fat on each structured steak. Upon cooking, the shrinkage will be uniform from product to product. This results because of the severed connective tissue network. The elastin content of the connective tissue has not been changed, but since the connective tissues have been severed, the irregular shrinkage and curling or other change in shape associated with the cooking of the natural cut of meat is eliminated. The amount of shrinkage is generally less than that of a natural cut of meat, and is both controllable and reproducible.

On cooking, fat from the rim or cap bastes into the meat for natural flavoring. The juiciness on cooking also is more consistent as a result of the uniform moisture content of the meat. The cooked product is uniformly tender, resulting from the absence of gristle and sinew, from the severed connective tissue, from the uniform moisture content and from the uniform fat layer. The texture and flavor are uniform, and the cooking time and temperature are likewise uniform.

BRIEF DESCRIPTION OF THE DRAWINGS

A detailed description of the invention will be made with reference to the accompanying drawings wherein.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Figure 1:
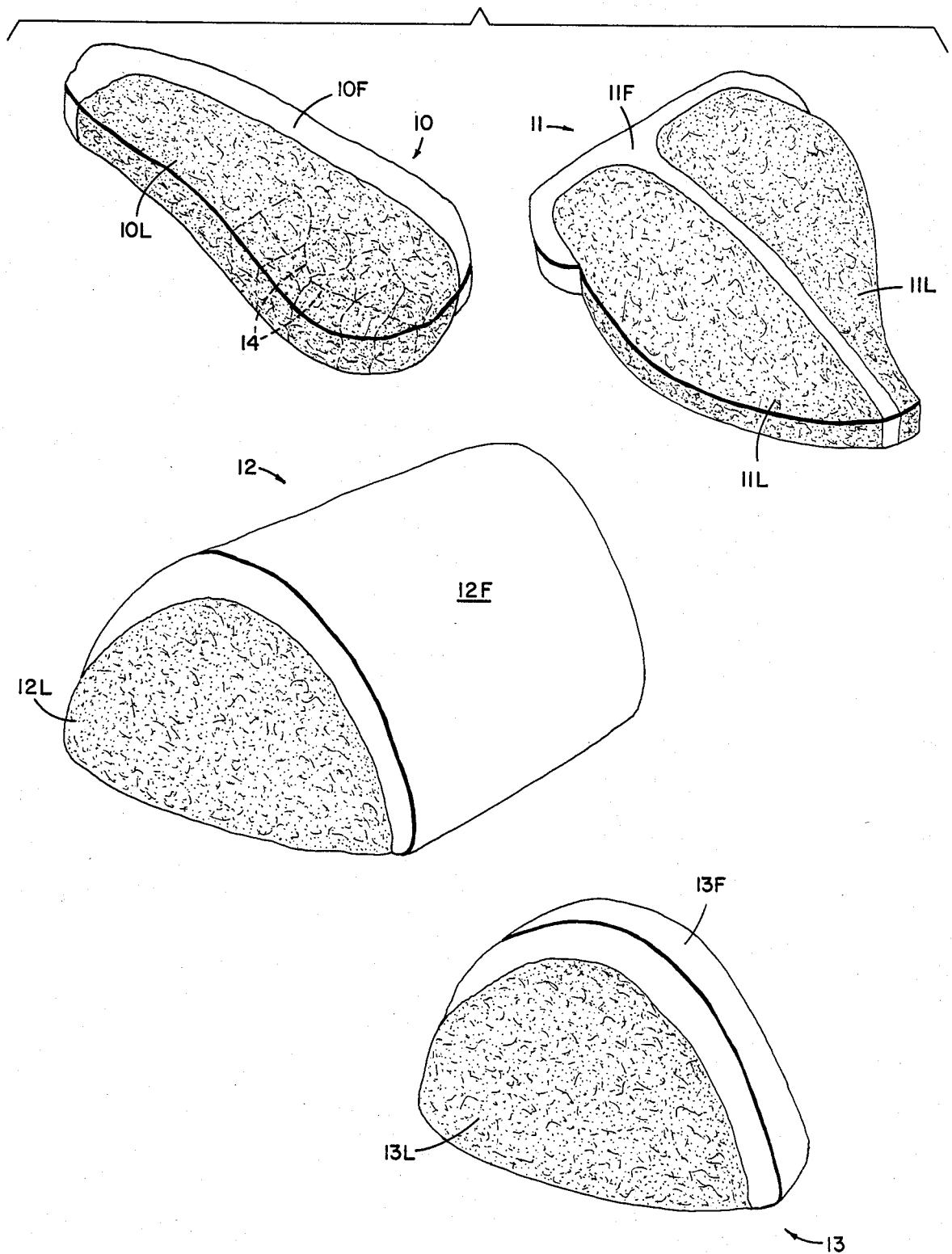
FIG. 1 is a pictorial view of several structured meat products in accordance with the present invention.

FIG. 1 shows typical structured meat products produced in accordance with the present invention and resembling natural cuts of meat. These include a product 10 which resembles a round steak, a product 11 in the shape of a porterhouse or T-bone steak, and a product 12 in the shape of a roast from which a slice 13 has been cut. Each product is characterized by a lean meat portion 10L, 11L, 12L, 13L and a fat rim 10F, strip 11F or cap 12F, 13F. Each lean section consists of a plurality of lean meat chunks 14 bonded together by a sticky protein exudate so as to form a unitary lean meat mass. The composition of the chunks 14 is substantially uniform, and the protein exudate maintains the chunks in intimately bonded relationship so that the entire mass exhibits the characteristics of a unitary piece of meat. The fat portion 10F-13F is bonded to the lean portion 10L-13L by the protein exudate from the meat chunks 14 along the lean-fat interface.

To produce the inventive structured meat products, an animal carcass is butchered (step 15, FIG. 2) into large primal cuts such as top and bottom rounds, chuck, knuckles, etc. The present invention is applicable to edible meats of all types, including but not limited to beef, pork, sheep, lamb, poultry and venison, but for simplicity of explanation, the following description will be made using beef as an example.

A benefit of the present invention is that less expensive grades of beef can be used, and will produce a product which is of equal or better tenderness, flavor and texture than a corresponding natural cut of better grade beef. Thus, the present invention advantageously uses meat in which the lean or muscle portion has a very low fat content as compared with better or top grade of beef in which the muscle is marbled with fat. Such lean-muscled beef includes e.g., cow beef and range beef.

The primal cuts are denuded (step 16) of all fat, sinew, gristle, skin and bones. The high fat content trimmings are separated out, and the remaining large pieces of completely lean muscle are prepared for chunking (step 17). Removal of the gristle and sinew eliminates "low quality" protein, thereby improving the overall quality of the final product.

In the chunking step 17, the whole muscles are cut into pieces having individual weights in the range of between about $\frac{1}{8}$ pound and about $\frac{3}{8}$ pounds, so that a typical chunk will weigh on the order of $\frac{1}{4}$ pound. The size of the chunks typically ranges from about one-quarter inch cubed to about three inches cubed, with the preferred range on the order of about one and one-half to two inches cubed. The chunking may be accomplished by first passing the large muscle pieces through a slicer and then through a cuber. Advantageously, the cubing is carried out with the meat in a temperature range of between about 18° F. and 24° F. If the large denuded primal muscle pieces are frozen to freezer temperature (typically 0° F.), a microwave tunnel or other heating mechanism may be used to warm the pieces to the preferred temperature range prior to chunking.

Next the chunks are subjected to a short interval incision process which accomplishes multiple severing of the connective tissues (step 18). In the lean meat, the muscle cells are supported on a scaffold network or lattice of connective tissue. This scaffold network is broken up by making numerous incisions into the lean chunks, typically by using a rotary knife tenderizer having multiple blades. The blades may be $\frac{1}{4}$ inch long, so that the multiple cuts are made deep into the meat. However, the optimum blade length may be greater or less than this value in accordance with the chunk size. This process, in addition to multiple severing of the connective tissue, also abrades the surface of the chunks so as to expose a far greater surface area for improved infusion when the final structured meat product is later cooked for consumption. At the end of this step, the meat chunks now comprise slackened muscle tissue on a multiple severed connective tissue supporting network.

As an alternative to mechanically severing the connective tissues, this may be accomplished by enzyme action. For example, bromelin, papain or ficin enzymes may be injected into or otherwise added to the lean meat chunks to break down the elastin and/or collagen in the connective tissue.

The following steps 19, 20 and 21 advantageously, but not necessarily, are carried out in a vacuum blender 22. This device may comprise a vacuum-tight container capable of holding a very large quantity of meat. Within the container are situated two or more rigid, spiral metal ribbons separated from each other by a distance of several times the average dimension of a typical meat chunk. For example, each ribbon may have a diameter of about eighteen inches, with the ribbons separated from each other by about four inches. Preferably each ribbon is mounted so as to rotate about its own axis, and is motor-driven at a controllable speed in the range of between about 5 rpm and about 30 rpm. Evacuation equipment associated with the blender typically is capable of reducing the pressure in the blender to a level substantially below that of normal atmospheric pressure. For example, the pressure may be reduced to a level of less than about 25 inches of mercury. The blender may contain provisions for steam injection, for massage, for time and temperature control and for $CO_2$ snow injection to achieve extrusion temperature control. It will be understood, however, that the use of such a vacuum blender is exemplary only, and other devices for mechanically working meat, preferably under partial vacuum conditions, may be used in the present invention.

Prior to massaging and water content adjustment, the temperature of the meat chunks may be brought up to optimum value by the injection (step 19) of steam into the vacuum blender. This is particularly advantageous when the lean meat chunks have been frozen for storage, as to a temperature in the typical range of from about 2° F. to about 14° F. Although a microwave tunnel could be used to heat the lean chunks to the acceptable massaging temperature range (typically from about 24° F. to about 38° F.) such microwave heating has some tendancy to precook the meat. Steam injection heating, however, appears not to have this precooking effect. A combination of initial, partial microwave heating and steam injection also may be used.

The moisture content of the lean meat may be adjusted during the vacuum massaging operation. This permits reproducible control of the moisture content in the lean portion of the resultant structured meat product. The moisture content in turn effects the juiciness and flavor of the cooked meat.

To accomplish moisture adjustment, the protein-to-moisture ratio of the meat chunks is measured prior to placing the meat into the vacuum blender. For example, this ratio may turn out to be 3.7:1, whereas the desired protein-to-moisture ratio may be say 4:1. In such instance, a controlled amount of water is injected into the vacuum blender 22 (step 19). The amount of water to be added will depend on the weight of the meat placed in the vacuum blender, the initial protein-to-moisture ratio, the desired ratio, and other factors including the vacuum pressure at which the massaging (step 20) is carried out. However, once these factors have been determined, the process is repeatable. In other words, a table can be prepared which relates the amount of water to be added to the factors of initial and desired protein-to-moisture ratios, total meat weight and vacuum pressure level. Thereafter, the operator need only refer to this table to determine the requisite amount of water which is to be injected into the vacuum blender to accomplish the desired moisture level in the resultant structured meat product.

Once the moisture has been added, the pressure in the vacuum blender 22 is reduced, typically to a level at which about an 80% vacuum is achieved. For example, the pressure may be reduced to the level of about 23.8 inches of mercury. The exact pressure level is not critical, however, and a rather wide range of vacuum levels produces acceptable results. The vacuum condition causes the muscle cells in the meat chunks to open, swell or expand. As a result, the cells are able to absorb and hold some of the water which was injected into the vacuum blender (step 19) prior to evacuation. This vacuum-induced opening and expansion of the muscle cells, with the concomitant water absorption therein, produces the desired increase in moisture content of the lean meat.

With the blender 22 under vacuum conditions, the meat chunks are massaged (step 20) to produce the sticky protein exudate. Advantageously, this massaging is accomplished in a blender of the type described by rotating the rigid spiral ribbons. This mechanical action causes the chunks of meat to be rubbed against each other under friction conditions. The massaging causes protein to be exuded from the muscle so as to form a sticky coating on the chunks. The protein consists primarily of myosin, a fibrous globulin of muscle. As noted above, the temperature of the meat chunks may be adjusted by prior steam injection to optimize protein exudation. The massaging of the meat (step 20) is carried out under controlled conditions so as to produce just sufficient protein exudate to provide a sticky coating which will effectively bind together the meat chunks in the resultant structured product. The variables which effect the protein exudation operation include the temperature of the meat in the blender 22, the speed of agitation and the total time that the massaging is carried out. However, these factors are reproducible. Thus, for a given set of conditions (i.e., for a given meat temperature, agitation speed and time of massaging), a substantially uniform, reproducible amount of sticky protein exudate will result. Thus a set of tables can be produced relating these factors, or the information can be stored in a computer which will control the massaging operation so as to produce the desired result. The temperature of the meat in the vacuum blender 22 may be either below or above freezing. Thus, the meat may be frozen at a temperature of about 24° F. to 32° F. or it may be unfrozen in the temperature range of from 32° F. to 38° F. In general, the higher the temperature, the lower will be the required massaging time to produce the desired sticky exudate coating. The speed of agitation is not critical, but should not be so fast as to cause the chunks of meat to break up into a paste. In a ribbon-type blender, a typical ribbon rotation rate in the range of about 10 rpm to about 20 rpm has been found adequate to produce the requisite protein exudate without breaking up the meat chunks into smaller particles.

A water soluble salt or phosphate may be added to the meat in the blender 22 to speed up the protein extraction. For example, for the same volume of meat, temperature and agitation rate, the time required to produce the requisite protein exudate coating may be reduced from say one hour, when no salt is used, to perhaps fifteen minutes by employing salt and/or phosphate with the meat. The addition of phosphate also has the benefits of improving the meat color, of providing an anti-oxidizing agent, and of promoting the retention of juices by the meat on cooking As an alternative to mechanical massaging, ultrasonic sound may be used to agitate or "massage" the meat chunks so as to produce the desired protein exudate.

After massaging (step 20), the muscle tissue is so slackened that the chunks of meat may not adequately maintain the desired shape when extruded. Accordingly, to improve the shape-retaining characteristics, the meat chunks advantageously are chilled (step 21) to a temperature on the order of about 22° F. to about 24° F. In this temperature range, when the meat chunks are extruded they will bind together and maintain the desired shape. However, extrusion temperatures as high as 50° F. can be used depending upon the type of fat and lean cohesion desired. In general, the higher the temperature, the greater the "stickiness".

The chilling may be carried out by introducing $CO_2$ snow (i.e., particles of dry ice) into the blender 22 after the vacuum has been shut off and the pressure brought back up to atmospheric. Preferably the agitation is continued as the $CO_2$ snow is introduced. The dry ice temperature is on the order of $-110°$ F. As the carbon dioxide sublimes, it cools the meat chunks to the desire temperature. In addition, the low dry ice temperature kills bacteria in the meat, and the vaporized $CO_2$ gas removes entrapped oxygen from the meat and improves its color. At the end of this operation (step 21) the lean meat chunks are ready for extrusion (step 25) together with a fat emulsion which forms the fat cap or rim in the resultant structured product.

This fat may be advantageously formed from the fat trimmings produced during the denuding (step 16) of the primal cuts. However, it is preferable to use fat from higher grade choice beef. Such fat from steer or feed lot animals which have been fed corn or milo tends to have a whiter color and different, more widely accepted taste than fat from cow or other low grade beef, which fat tends to be yellow in color.

Large chunks of fat may be broken down into smaller pieces using an extructor. A silent cutter may be used to reduce these fat chunks to even smaller size. The resultant small pieces of fat then are chopped or ground and blended (step 26) to form a paste-like emulsion.

As an option (step 27), some lean meat, ground to paste-like consistency, may be added to the fat emulsion. The effect of such addition is to produce a fat rim or cap on the resultant structured meat product which is slightly pinkish-white in color. More important, when the product is cooked, the fat rim or cap will have some browness to it. As a result, the consumer is less likely to cut away the fat, and is more likely to eat this lean-containing fat portion. Waste is reduced. The amount of lean meat added (at step 27) typically may be up to 50% by weight of the resultant fat emulsion-lean meat mixture. Soy or other protein could be combined with the fat so that the "fat" layer of the resultant product will have a protein content which approximates that of the lean portion. Such a product is totally edible and waste free.

To improve the ability of the fat emulsion to retain its shape upon extrusion, the emulsion advantageously is chilled (step 28) by the addition of $CO_2$ snow (dry ice particles) to a temperature about the same as that of the chilled lean chunks. The lean and fat components then are simultaneously supplied to the extrusion mechanism.

The simultaneous extrusion (step 25) is carried out using an extrusion head 30 having two separate but adjacent extrusion chambers 31, 32 separated by a median wall 33. These chambers 31, 32 are configured so as to impart the desired shape to the extruded product. For example, in FIG. 2 the extrusion head 30 is configured to produce a structured meat product 10 having the shape shown in FIG. 1.

The chilled fat emulsion is fed through the extrusion chamber 31 at the same time that the protein exudate covered lean meat chunks are fed through the extrusion chamber 32. For both fat and lean components, a vane pump, screw auger or other mechanism may be used to force the lean and fat materials through the extrusion head under pressure. Such pressure ensures that the meat chunks 14 will be tightly bonded together by the protein exudate, and that the fat rim or cap will be adequately bonded to the lean section by the same protein exudate. This fat-lean bonding may be aided by terminating the median wall 33 in a recessed relationship with respect to the exit ends of the chambers 31 and 32. With such arrangement, the fat emulsion will come into direct contact with the adjacent lean meat portion prior to emergence of the product from the extrusion head 30.

The extrusion process may be carried on in a somewhat continuous fashion, so as to form an elongated log of the finished product having the desired cross-sectional shape. An appropriate cutter may be used to sever this log at regular intervals so as to form the individual steak-like products 10 shown in FIG. 1. Alternatively, the extrusion may be carried out in increments in which individual steak-like products are extruded at sequential time intervals. The extrusion may be in a horizontal direction, which is particularly useful in forming a log-type product which is subsequently sliced. Thus the technique is applicable to forming the roast product 12 of FIG. 1. Alternatively, the extrusion may be carried out vertically, as for example, by discharging the product into individual molds or dies which are successively placed beneath the extrusion head. In the latter arrangement, the shape of the product may be imparted either by the extrusion head itself or by the shape of the individual mold or die. A three-chambered extrusion head may be used to form the T-bone steak product 11 of FIG. 1.

The extrusion step 25 is followed by packaging and, optionally, freezing of the structured meat products for distribution (step 34). A particulaly attractive package is formed by covering individual steak-like products 10, 11 with a transparent plastic film such as that sold under the trademark "Surlyn". The roast product 12 may be inserted into a transparent plastic bag or other container. Insertion may be aided by "crusting" the extruded roast with dry ice. By covering the surface of the roast with $CO_2$ snow, the surface will become hard and non-sticky, making it easy to insert the roast product 12 into a plastic container. Chilling of the extruded log-shaped product also may aid the uniform slicing of the log into individual steak-like products. After distribution, the structured meat product is either thawed or handled frozen by the consumer and cooked in an oven. During the thawing and cooking cycles, the product will exhibit uniform shrinkage without the unpredictable curling, shape changes and nonuniformity of shrinkage exhibited by natural cuts of meat. This uniformity of shrinkage results in part because the connective tissue throughout the muscle portion has been multiply severed. Thus although the elastin protein content of the meat remains unchanged, the contraction of this elastin upon heating is limited to the very short remaining sections of connective tissue. There are no long connective tissues present which, in a natural cut of meat, would curl or substantially contract when the meat is cooked. The fat cap 12F allows the roast product 12 to be cooked without a foil covering, since the fat cap protects the lean portion 12F from burning while at the same time basting fat into the meat for natural flavoring. Each slice 13 of the roast has an identical fat covering, and ensures even flavor distribution from slice to slice.

The uniform protein-to-moisture ratio ensures that each individual meat product will exhibit a uniform juiciness on cooking. The absence of sinew and gristle, coupled with the slackened connective tissue network ensure that each meat product will be tender and will have a uniform texture. These characteristics permit the inventive structured meat products to be cooked at preset times and temperatures. For example, once it is established that the product 10 will be cooked to a "medium rare" condition in a certain time and cooking temperature, that same time and temperature can be used repetitively, and will consistently produce a like "medium rare" steak. The need individually to monitor the cooking time and temperature of each steak, as required when cooking a natural cut of meat, thereby is eliminated.

Figure 2:
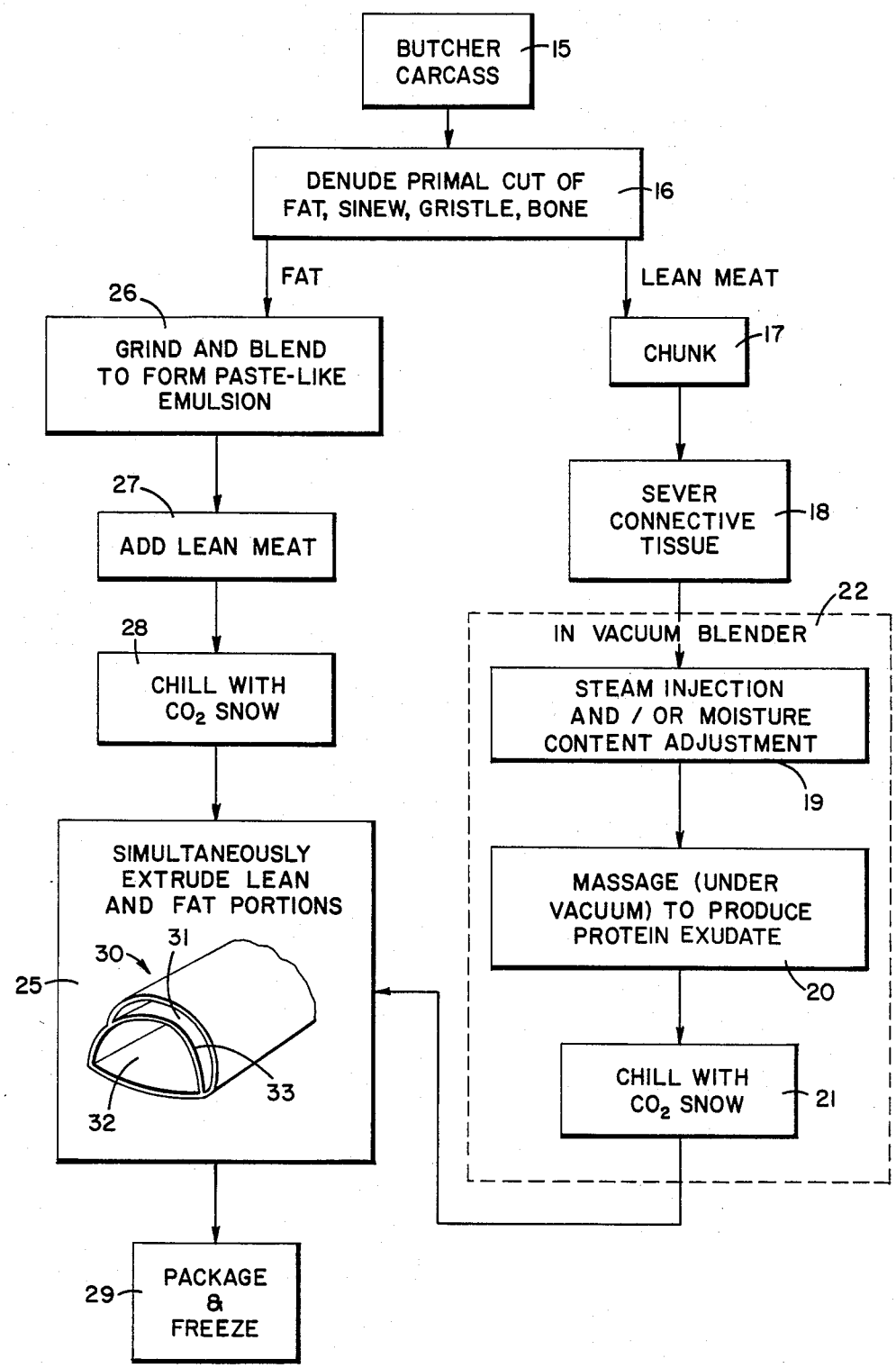
FIG. 2 is a flow chart illustrating the inventive process used to make the products of FIG. 1.

Certain variations may be introduced into the process illustrated in FIG. 2 so as to produce somewhat different structured meat products. For example, a controlled amount of fat particles, trimmings or emulsion may be combined with the lean chunks in the vacuum blender 22 during the massaging operation (step 20). This may be done, for example, so as to "marble" a controlled amount of fat into the lean portion of the extruded product.

Alternatively, non-meat protein ingredients may be added to the lean meat mass for the purpose of adjusting the taste, food content and/or cost of the resultant product. Thus, soy protein extenders or other vegetable proteins may be mixed with the meat. Wheat flour, gluten or soy flour also could be added. Similarly, a white soy flour, soy protein isolates, wheat flour or gluten could be added to the fat emulsion (at step 26 or 27) to reduce the fat content while still maintaining an attractive white or pinkish-white appearance to the fat cap or rim. Such additions could make the fat portion of the resultant product equal in protein content to the lean portion.

Other modifications may be made to produced structured meat products that are engineered for particular needs, or to satisfy the specific nutritional requirements of various age groups or of persons having particular physical or medical conditions. These include, but are not limited to, the addition of vitamins and minerals, adjustment of the fiber content, modification of the protein class ratios, changes in the calorie or carbohydrate-to-protein ratio, balancing of the saturated and polyunsaturated fat content, and others.

27.

Vitamins and/or minerals which are water soluble (such as vitamin C and the B-complex vitamins) may be added to the lean meat section, for example at step 19. Fat soluble vitamins such as vitamins A, D, E and K may be added to the fat portion, as at step 26 or 27. The added benefit of antioxidation is derived from the addition of vitamins C or E. Other antioxidants such as BHA and BHT also could be added.

The fiber content, or the protein-to-fiber ratio may be altered by the addition (at step 19) of cellulose from a wood source. Alternatively, bran or other fibers may be added to the product.

The carbohydrate-to-protein ratio may be controlled by the addition of sugar to either the lean (at step 19) or fat portion (at step 26 or 27). If sugar is added to the fat portion, it also provides control of the browning effect on cooking due to sugar caramelization. The addition of sugar also permits control of the calorie content of the product. Another way that the calorie-to-protein ratio can be controlled is to adjust the extruded fat-to-lean portion ratio (at step 25).

The ratio of saturated-to-polyunsaturated fats can be balanced by the addition to the fat emulsion (at step 26) of a highly unsaturated fat such as soybean oil or safflower oil. The addition of such unsaturated fatty acids is believed to influence the reduction of cholesterol levels in humans.

By appropriately combining these variants, a wide variety of engineered structured meat products can be achieved for specific purposes.

The shape of the extruded product need not resemble a cut of natural meat. Other shapes may be employed for different purposes. For example, a loaf having rectangular or circular cross-section may be used to provide slices of meat which, when used in sandwiches, will conform to the shape of the sandwich bread or roll. As another example, the shape of the product may be engineered to achieve a particular heat transfer characteristic on cooking. Thus the shape may be engineered to produce e.g., a roast which has a rare interior and a well done outer layer, or conversely, to ensure uniform cooking throughout the entire roast. Such shape engineering also may be used to optimize the cooking time of a particular product.

The extrusion shapes are by no means limited to those illustrated or specifically described herein. Other configurations are possible. For example, multiple chambers may be used to extrude sections of fat emulsion at multiple locations within the lean portion. These may be configured to produce a marbling effect.

All of the processes described herein have the unique benefit of providing structured or engineered meat products with consistent, controllable, reproducible characteristics. The reproducibility of appearance, size, shape, fat content, juiciness, tenderness, texture, shrinkage and uniformity of cooking time and temperature provide products which are uniquely beneficial to mass food service establishments. Total portion and cost control is achieved, with no compromise in taste or appearance of the product. Consumer acceptance is aided by the fact that the product has the appearance, both uncooked and cooked of a conventional cut of natural meat, and has the natural taste, texture and juiciness characteristics of best quality meat.

Since the inventive structured meat products are formed from least cost lean meat, the resultant products themselves may be significantly lower in cost than the natural cuts of meat which they simulate. Yet this cost saving is achieved with no compromise in quality, nutritional value, appearance or taste. Since the process is repeatable, very large quantities of the inventive structured meat product may be made without the problem of repeatability which in the past has prevented most high volume retail food establishments from including products such as steak in their menu.

We claim:

1. A process for making a structured meat product, comprising the steps of:

preparing chunks of lean meat substantially free of fat, gristle and sinew, massaging said meat chunks, under a pressure of less than about 23.8 inches of mercury, and introducing sufficient water so as to obtain a controlled protein-to-water ratio in the massaged meat chunks, said massaging being carried out for a sufficient time and at a temperature so as to produce a sticky protein exudate on said chunks, and simultaneously extruding said massaged meat chunks and an extrudable emulsion of fat through separate but adjacent extrusion heads to form a shaped structured meat product having a lean meat region comprising said massaged meat chunks bound together by said protein exudate and a contiguous fat region formed of said extruded fat emulsion and bound to said meat region by said protein exudate, said extrudable fat emulsion having a paste-like consistency, said extrusion being performed at a temperature wherein the extruded meat chunks and fat emulsion achieve integrity and maintain their extruded shape.

2. A process according to claim 1 wherein said step of massaging is carried out in a vacuum blender, said water being introduced into said blender prior to evacuation thereof.

3. A process according to claim 2 wherein said vacuum blender includes at least two rigid spiral ribbons each rotatable about its axis, said axes being generally parallel and having the individual spiral ribbons spaced apart from each other, the speed of rotation of said spiral ribbons being controlled together with the time and temperature of said massaging so as to obtain a desired degree of chunk-to-chunk protein exudate adhesion.

4. A process according to claim 2 together with the steps of:

terminating the evacuation of said blender but continuing said massaging, and introducing particles of dry ice into said blender during said continued massaging, said dry ice cooling said massaged meat chunks to a temperature at which said meat chunks will maintain said definite shape after extrusion.

5. A process according to claim 1 wherein said step of preparing comprises:

denuding substantially all fat, gristle, sinew and skin from large primal cuts of natural meat, and cutting said denuded primal cuts into individual meat chunks having a weight in the range of between about ⅛ pound and about ⅜ pound and a maximum dimension in the range of between about ¼ inch and about 3 inches.

6. A process according to claim 1 wherein said meat chunks are prepared by separating the fat, gristle and skin from large primal cuts of natural meat, and wherein said extrudable emulsion of fat is produced by the steps of:

chopping or grinding and blending separated solid fat trimmings into a paste-like emulsion, and chilling said paste-like emulsion to a sufficiently low temperature at which said emulsion can be subjected to shape-retaining extrusion as an integral portion of said formed meat product.

7. A process according to claim 6 wherein said meat chunks are prepared from low grade meat having low fat content muscle and wherein said chopped and blended fat trimmings are the fat trimmings from high grade meat.

8. A process according to claim 6 wherein said chilling is accomplished by mixing dry ice with said paste-like emulsion, said sufficiently low temperature being in the range of from about 24° F. to about 45° F.

9. A process according to claim 6 together with the step of:

adding up to about 50% by weight of lean meat to said fat emulsion prior to said step of extruding.

10. A process according to claim 1 wherein said lean meat initially is frozen to a freezer temperature of about 0° F. and including the initial step of heating said freezer meat to a temperature in the range of between about 24° F. and 30° F. prior to said massaging.

11. A process according to claim 1 including the step of heating said meat chunks to within the range of about 24° F. to 38° F. prior to massaging with steam.

12. A process according to claim 1 wherein said massaging is performed using ultrasonic sound.

13. A structured meat product made by the process of claim 1.

14. A process according to claim 1 wherein said extrusion heads are shaped to form a structured meat product which is a facsimile of a natural primal or portion cut of meat, said lean meat region and said fat region each corresponding in shape, dimension and configuration to said natural cut.

15. A process for making a structured meat product, comprising the steps of:

preparing chunks of lean meat substantially free of fat, gristle and sinew, slackening the muscle supportive structure in said meat chunks, massaging said meat chunks, under a pressure of less than about 23.8 inches of mercury, and introducing sufficient water so as to obtain a controlled protein-to-water ratio in the massaged meat chunks, said massaging being carried out for a sufficient time and at a temperature so as to produce a sticky protein exudate on said chunks, and simultaneously extruding said massaged meat chunks and an extrudable emulsion of fat having a paste-like consistency through separate but adjacent extrusion heads to form a shaped structured meat product having a lean meat region comprising said massaged meat chunks bound together by said protein exudate and a contiguous fat region formed of said extruded fat emulsion and bound to said meat region by said protein exudate, said extrusion being performed at a temperature wherein the extruded meat chunks and fat emulsion achieve integrity and maintain their extruded shape.

16. A process according to claim 15 wherein said step of slackening comprises the multiple severing of the connective tissue which forms the muscle supportive structure of said meat chunk.

17. A process according to claim 16 wherein said step of multiple severing comprises:

utilizing plural knives to make multiple deep incisions into each meat chunk, said knives severing the connective tissue at short intervals.

18. A process according to claim 17 wherein said plural knives are rotary blades adjusted in length so as to make incisions into said meat chunks to a depth in the range of between about ¼ inch and about ½ inch.

19. A process according to claim 15 wherein said step of slackening comprises introducing an enzyme into said meat chunks, said enzyme being selected from the group consisting of bromelin, papain and ficin in a tenderizing amount.

20. A process for making a structured meat product that is a facsimile of a natural primal or portion cut of meat, comprising:
separately preparing a fat mass of paste-like consistency and a meat mass consisting of lean meat chunks having a protein exudate sticky coating, and
simultaneously extruding said fat mass and said meat mass through separate but adjacent extrusion heads to form a structured meat product of definite shape imparted by said extrusion heads, said product having distinct fat and lean meat portions bonded together by said protein exudate, said extrusion heads being configured so that said fat and lean meat portions each correspond in shape, dimension and configuration to the corresponding sections of said natural cut, said extruding being performed at a temperature wherein the extruded meat mass and the extruded fat mass achieve integrity and maintain their extruded distinct shape.

21. A process according to claim 20 wherein said product is extruded in the form of an elongated roast-like cut of meat, said process including the further steps of:
applying dry ice particles to the surface of said extruded product to chill and thereby harden the surface thereof, and
inserting said product into a package, said dry ice hardened surface facilitating such package insertion.

22. A process according to claim 20 wherein said meat mass is prepared by:
denuding a primal cut of meat having low fat content muscle of substantially all fat, gristle, sinew and skin,
cutting said denuded primal cut into chunks each having a weight in the range of about ⅛ pound to about ⅜ pound,
slackening the connective tissue scaffold network in each of said chunks,
agitating said chunks under a pressure of less than about 23.8 inches of mercury until a sticky coating of protein exudate is produced on the surface of said chunks, and
chilling said agitated meat chunks with $CO_2$ snow to a temperature at which said meat mass subsequently will retain the shape imparted by said extrusion.

23. A process according to claim 22 further comprising:
adding water to said chunks prior to said reduced pressure agitation so that said water will be taken up by the cells of said meat chunks, the amount of added water being selected to produce a desired protein-to-moisture content of said meat in the resultant product.

24. A process according to claim 20 further comprising:
including in said prepared fat mass additional ingredients selected from the group consisting of supplemental amounts of fat soluble vitamins, vegetable protein, sugar, unsaturated fat and lean meat.

25. A process according to claim 20 further comprising:
including in said meat mass additional ingredients selected from the group consisting of supplemental amounts of water soluble vitamins, cellulose, vegetable fiber, non-meat protein, sugar and fat.

26. A process according to claim 20 wherein said step of preparing a fat mass comprises blending an emulsion of animal fat and supplemental amounts of unsaturated vegetable fat.

27. A process according to claim 20 wherein said meat chunks are prepared from low grade, low cost beef having low fat content in the muscle, and wherein said fat mass comprises a mixture of ground fat from high grade beef and up to about 50% by weight of ground lean meat muscle, said mixture having a paste-like consistency.

28. A structured meat product produced by the process of claim 20.

29. A process according to claim 28 including the step of combining fat particles with said lean meat chunks during said preparing step so as to "marble" a controlled amount of fat into said lean meat portion of said formed product.

30. A process according to claim 20 wherein said extrusion heads are configured to form a structured meat product in which at least part of the fat portion is substantially surrounded by lean meat portions so as to be a facsimile of fat marbling in said natural cut of meat.

31. A process for making a fabricated meat product which is a facsimile of a natural primal or portion cut of meat, comprising:
preparing a meat mass consisting of lean meat muscle chunks having a protein exudate sticky coating,
separately preparing a paste-like fat mixture consisting of ground fat trimmings and up to about 50% by weight of ground lean meat muscle, and
coextruding said meat mass and said paste-like fat mixture through separate but adjacent extrusion heads to form a unitary, shaped fabricated meat product having distinct fat and lean portions bonded together by said protein exudate, said extrusion heads being configured to impart respectively to said meat mass and said fat mixture the shape, dimensions and relative locations of corresponding lean and fat regions of the natural meat cut being copied, including interior fat marbling regions, said coextruding being performed at a temperature wherein the coextruded meat mass and fat mixture achieve integrity and maintain their respective imparted shape.

32. A process according to claim 31 further comprising:
chilling said paste-like fat mixture prior to said coextruding to a temperature at which said fat mixture will retain the shape imparted by said extrusion heads and the integrity with said lean portion.

33. A process for making a structured meat product comprising:
separately preparing a fat mass of paste-like consistency and a meat mass consisting of lean red meat chunks having a protein exudate sticky coating, and
simultaneously extruding said fat mass and said red meat chunks through separate but adjacent extrusion heads to form a shaped structured meat product having distinct fat and lean red meat portions bonded together by said protein exudate, said extruding being performed at a temperature wherein the meat and fat portions achieve integrity and maintain the extruded shape imparted to them by said extrusion heads.

34. A structured meat product produced by the process of claim 33.

35. A process for making a fabricated meat product which is a facsimile of a natural primal or portion cut of meat, comprising:

preparing a meat mass consisting of lean meat muscle chunks having slackened muscle supportive tissue and a protein exudate sticky coating, separately preparing a paste-like fat mixture consisting of ground fat trimmings and up to about 50% by weight of ground lean meat muscle, and coextruding said meat mass and said paste-like fat mixture through separate but adjacent extrusion heads to form a unitary, shaped fabricated meat product having distinct fat and lean portions bonded together by said protein exudate, said extrusion heads being configured to impart respectively to said meat mass and said fat mixture the shape, dimensions and relative locations of corresponding lean and fat regions of the natural meat cut being copied, including interior fat marbling regions, said coextruding being performed at a temperature wherein the coextruded meat mass and fat mixture achieve integrity and maintain their respective imparted shape.

* * * * *